United States Patent
Okumura

(10) Patent No.: US 11,969,990 B2
(45) Date of Patent: Apr. 30, 2024

(54) INK DISCHARGING APPARATUS, INK HEATING METHOD, AND WATER-BASED INK FOR RECORDING

(71) Applicant: BROTHER KOGYO KABUSHIKI KAISHA, Nagoya (JP)

(72) Inventor: Yuki Okumura, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 247 days.

(21) Appl. No.: 17/543,950

(22) Filed: Dec. 7, 2021

(65) Prior Publication Data

US 2022/0088944 A1 Mar. 24, 2022

Related U.S. Application Data

(63) Continuation of application No. PCT/JP2020/023177, filed on Jun. 12, 2020.

(30) Foreign Application Priority Data

Jul. 10, 2019 (JP) .................................. 2019-128275

(51) Int. Cl.
*B41J 11/00* (2006.01)
*B41M 5/00* (2006.01)
(Continued)

(52) U.S. Cl.
CPC ...... *B41J 11/00216* (2021.01); *B41M 5/0023* (2013.01); *C09D 11/023* (2013.01);
(Continued)

(58) Field of Classification Search
CPC .... B41J 11/00216; B41J 2/01; B41M 5/0023; C09D 11/023; C09D 11/033;
(Continued)

(56) References Cited

U.S. PATENT DOCUMENTS

2010/0178425 A1 7/2010 Ooishi et al.
2011/0090279 A1 4/2011 Yanagi et al.
(Continued)

FOREIGN PATENT DOCUMENTS

AU 2017-202189 A1 3/2018
EP B 249 021 A1 11/2017
(Continued)

OTHER PUBLICATIONS

Machine Translation of WO 2019/004485, Fuji, Yusuke et al., "Pretreatment Liquid for Impermeable Medium Printing, Substrate for Printing, Method for Manufacturing Substrate for Printing, Image Recording Method, and Ink Set", Jan. 3, 2019, [see Whole Document] (Year: 2019).*

(Continued)

Primary Examiner — Lisa Solomon
(74) Attorney, Agent, or Firm — Merchant & Gould P.C.

(57) ABSTRACT

There is provided an ink discharging apparatus including: a conveyor, a head, and a heater. The water-based ink for recording includes: a resin-dispersed pigment, resin fine particles of which glass transition temperature is not less than 33° C., water, and an organic solvent including a specific organic solvent of which saturation vapor pressure at 20° C. is not less than 0.03 hPa. The ink discharging apparatus satisfies the following condition (I): $6 \leq (\beta/\alpha) \times 1000 \leq 31$. In the condition (I), $\alpha$ (° C.) is the glass transition temperature of the resin fine particles, and $\beta$ (J/cm$^2$) is an irradiation energy, radiated from the heater, per unit area of the recording medium.

19 Claims, 4 Drawing Sheets

(51) Int. Cl.
*C09D 11/023* (2014.01)
*C09D 11/033* (2014.01)
*C09D 11/037* (2014.01)
*C09D 11/107* (2014.01)
*C09D 11/326* (2014.01)

(52) U.S. Cl.
CPC .......... *C09D 11/033* (2013.01); *C09D 11/037* (2013.01); *C09D 11/107* (2013.01); *C09D 11/326* (2013.01)

(58) Field of Classification Search
CPC ... C09D 11/037; C09D 11/107; C09D 11/326; C09D 11/322
See application file for complete search history.

(56) References Cited

U.S. PATENT DOCUMENTS

| | | |
|---|---|---|
| 2013/0044169 A1 | 2/2013 | Chiwata |
| 2015/0251452 A1 | 9/2015 | Hatanaka et al. |
| 2016/0264795 A1 | 9/2016 | Asami et al. |
| 2018/0086067 A1 | 3/2018 | Mizutani |

FOREIGN PATENT DOCUMENTS

| | | | |
|---|---|---|---|
| JP | 2001-212948 A | 8/2001 | |
| JP | 2010-503741 A | 2/2010 | |
| JP | 2010-163534 A | 7/2010 | |
| JP | 2011-83968 A | 4/2011 | |
| JP | 2012-201691 A | 10/2012 | |
| JP | 2013-39820 A | 2/2013 | |
| JP | 2015-107604 A | 6/2015 | |
| JP | 2015-168114 A | 9/2015 | |
| JP | 2015-174227 A | 10/2015 | |
| JP | 2016-22683 A | 2/2016 | |
| JP | 2016-169366 A | 9/2016 | |
| JP | 2017-155246 A | 9/2017 | |
| JP | 2018-35295 A | 3/2018 | |
| JP | 2018-51955 A | 4/2018 | |
| JP | 2018-159037 A | 10/2018 | |
| JP | 2018159037 A * | 10/2018 | |
| JP | 2019-59878 A | 4/2019 | |
| JP | 2019-93596 A | 6/2019 | |
| JP | 2020-2309 A | 1/2020 | |
| WO | 2008/031765 A1 | 3/2008 | |
| WO | WO-2019004485 A1 * | 1/2019 | ................ B41J 2/01 |

OTHER PUBLICATIONS

Machine Translation of JP 2018159037, Miyamoto, Naomi et al., "Resin Particle Dispersion Liquid, Aqueous Ink, Ink Cartridge, Recording Device, and Recording", Oct. 11, 2018, [see Whole Document] (Year: 2018).*

Office Action (Notice of Reasons for Refusal) issued in corresponding Japanese Patent Application No. 2019-128275, dated Jun. 6, 2023.

International Preliminary Report on Patentability and Written Opinion of the International Searching Authority issued in corresponding International Patent Application No. PCT/JP2020/023177, dated Jan. 11, 2022.

Office Action (Notice of Reasons for Refusal) issued in corresponding Japanese Patent Application No. 2019-128275, dated Feb. 21, 2023.

International Search Report issued in corresponding International Patent Application No. PCT/JP2020/023177, dated Aug. 25, 2020.

* cited by examiner

INK DISCHARGING APPARATUS, INK HEATING METHOD, AND WATER-BASED INK FOR RECORDING

CROSS REFERENCE TO RELATED APPLICATIONS

The present application is a Continuation Application of International Application No. PCT/JP2020/023177 filed on Jun. 12, 2020 claiming priority from Japanese Patent Application No. 2019-128275 filed on Jul. 10, 2019. The disclosures of International Application No. PCT/JP2020/023177 and Japanese Patent Application No. 2019-128275 are incorporated herein by reference in their entireties.

BACKGROUND

The present disclosure relates to an ink discharging apparatus, an ink heating method, and a water-based ink for recording. More specifically, the present disclosure relates to an ink discharging apparatus provided with a mechanism which heats, by a heater, an ink discharged onto and adhered to a recording medium so as to fix the ink to the recording medium, an ink heating method (ink drying method) for fixing an ink discharged onto and adhered to a recording medium so as to fix the ink to the recording medium, and a water-based ink for recording which is suitable for being discharged onto and adhered to a recording medium and for being heated by a heater to be fixed to the recording medium. There is known a printing apparatus wherein a recording medium to which an ink discharged from a nozzle of a printing head is adhered is heated by a heater so that the ink is fixed to the recording medium.

In a case that printing using a water-based ink containing a pigment is performed on a low water-absorbing or non-water absorbing recording medium and that a printing surface of the recording medium for which the printing has been performed is rubbed or scratched, etc., it is problematic that the ink is removed or peeled off from the printing surface. Accordingly, it is desired that the ink is fixed to the recording medium in an ensured manner by a heating with a heater, etc. Further, there is also known a water-based ink including resin fine particles in order to improve the abrasion resistance with respect to the recording medium. However, in a case that the resin fine particles included in the water-based ink are not sufficiently melted, there is such a problem that the glossiness of the ink in a printed recoding medium is not satisfactory.

On the other hand, in a case that the size of the heater is increased so as to quickly perform the heating of the recording medium by the heater, there is such a problem that the size of the apparatus becomes large. Furthermore, an ink which is easily dried is likely to solidify in the vicinity of the nozzle of a printing head due to the drying, and thus easily adversely affects a discharging stability of the printing head.

SUMMARY

The present disclosure has been made in view of the above-described situation, and an object of the present disclosure is to provide an ink discharging apparatus which has an excellent abrasion resistance and an excellent glossiness of the recording medium after printing and an excellent discharging stability of the ink in the head, while suppressing the size of the apparatus from becoming large.

According to a first aspect of the present disclosure, there is provided an ink discharging apparatus including: a conveyor configured to convey a recording medium in a conveying direction; a head configured to discharge the water-based ink for recording onto the recording medium conveyed by the conveyor; and a heater which is located at downstream in the conveying direction of the head, and which is configured to heat the recording medium or the water-based ink for recording adhered to the recording medium. The water-based ink for recording includes: a resin-dispersed pigment, resin fine particles of which glass transition temperature is not less than 33° C., water, and an organic solvent including a specific organic solvent of which saturation vapor pressure at 20° C. is not less than 0.03 hPa. The ink discharging apparatus satisfies condition (I): $6 \leq (\beta/\alpha) \times 1000 \leq 31$. In the condition (I), $\alpha$(° C.) is the glass transition temperature of the resin fine particles, and $\beta$ (J/cm$^3$) is an irradiation energy, radiated from the heater, per unit area of the recording medium.

According to a second aspect of the present disclosure, there is provided an ink heating method of using the ink discharging apparatus of the first aspect. The ink heating method includes heating, by the heater, the recording medium or the water-based ink for recording adhered to the recording medium. The ink heating method satisfies condition (I): $6 \leq (\beta/\alpha) \times 1000 \leq 31$. In the condition (I), $\alpha$(° C.) is a glass transition temperature of the resin fine particles, and $\beta$ (J/cm2) is an irradiation energy, radiated from the heater, per unit area of the recording medium.

According to a third aspect of the present disclosure, there is provided a water-based ink for recording comprising: a resin-dispersed pigment; resin fine particles of which glass transition temperature is not less than 33° C.; an organic solvent including a specific organic solvent of which saturation vapor pressure at 20° C. is not less than 0.03 hPa; and water. The water-based ink for recording discharged from a printing head is fixed to a recording medium in a state that the recording medium is heated by a heater so that the water-based ink for recording satisfies condition (I): $6 \leq (\beta/\alpha) \times 1000 \leq 31$. In the condition (I), $\alpha$(° C.) is the glass transition temperature of the resin fine particles, and $\beta$ (J/cm$^2$) is an irradiation energy, radiated from the heater, per unit area of the recording medium.

DETAILED DESCRIPTION

Figure 1:
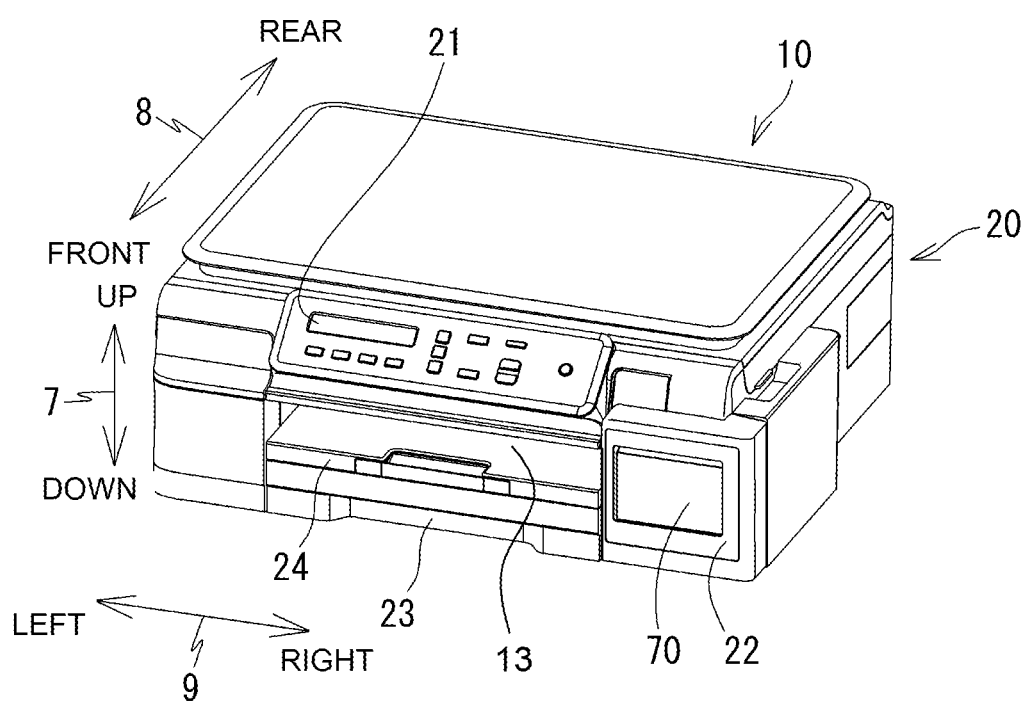
FIG. 1 is a perspective view of a printing apparatus.

In the following, a printing apparatus 10 (an example of an "ink discharging apparatus") according to an embodiment of the present disclosure will be explained. Note that the embodiment which is to be explained below is merely an example of the present disclosure; it is needless to say that the embodiment can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". Further, in the following explanation, an up-down direction 7 is defined, with a state in which the printing apparatus 10 is installed usably (a state of FIG. 1), as the reference; a front-rear direction 8 (an example of a "first direction") is defined, with a side on which a discharge port 13 is provided is defined as a front side (front surface); and a left-right direction 9 (an example of a "second direction") is defined, with the printing apparatus 10 as seen from the front side (front surface). The front-rear direction 8 and the left-right direction 9 are orthogonal to each other.

[Outer Configuration of Printing Apparatus 10]

As depicted in FIG. 1, the printer 10 is provided with a casing 20; and a panel unit 21, a cover 22, a paper feed tray 23 and a paper discharge tray 24 which are held by the casing 20. The printer 10 records an image on a sheet 6 (see FIG. 2).

The sheet 6 is an example of a "recording medium". The sheet 6 may be a recording medium which is cut to a predetermined size, or may be a recording medium which is a sheet pulled from a roll formed of the sheet wound in a cylindrical tube shape, or may be a recording medium of fan-fold type. Further, the sheet 6 may be plain paper, or coated paper (coated paper sheet). The term "coated paper" means high quality printing paper, medium quality printing paper, etc., which is plain paper having a pulp as a constituent element thereof and having a coating agent applied thereon for a purpose of improving the smoothness, whiteness, glossiness, etc.; specifically, the coated paper is exemplified by high quality coated paper, medium quality coated paper, etc. Although the printing apparatus 10 is suitably usable for ink-jet recording on the coated paper, the usage of the printing apparatus 10 is not limited to the recording on the coated paper; it is possible to use the printing apparatus 10 also for ink-jet recording with respect to a recording medium which is different from the coated paper and which includes, for example, plain paper, glossy paper, mat paper, synthetic paper, cardboard (paperboard), corrugated cardboard, film, etc. Further, the sheet 6 may be a tack paper in which an adhesive and release paper are combined.

The panel unit 21 is provided with a touch panel and a plurality of operation switches. The panel unit 21 receives an operation by a user.

Figure 2:
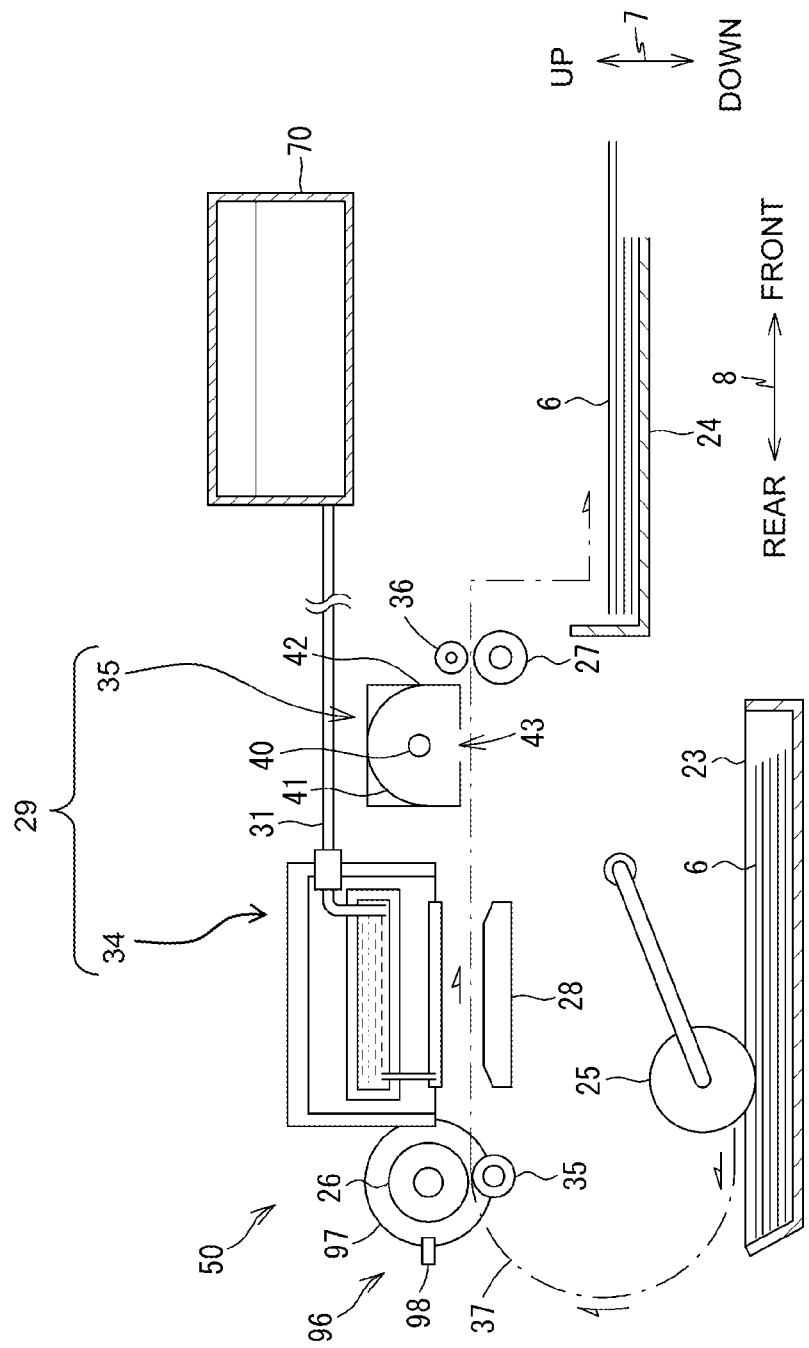
FIG. 2 is a schematic view depicting the internal configuration of the printing apparatus.

As depicted in FIG. 2, the paper feed tray 23 is positioned in a lower part of the casing 20. The paper discharge tray 24 is positioned in the lower part of the casing 20, at a location above the paper feed tray 23. The cover 22 is positioned in a right part of the front surface of the casing 20. The cover 22 is rotatable with respect to the casing 20. In a case that the cover 22 is opened, it is possible to access to a tank 70 storing an ink.

Note that although only one tank 70 is depicted in the present embodiment, the tank 70 is not limited or restricted by being a tank storing one color ink such as black, etc.; it is allowable, for example, that the tank 70 may be a tank having four storing chambers which store four color inks that are black, yellow, cyan and magenta, respectively.

As depicted in FIG. 2, the casing 20 holds a printing engine 50 in the inside of the casing 20. The printing engine 50 is mainly provided with a paper feeding roller 25, a conveying roller 26, a discharging roller 27, a platen 28 and a recording unit 29. The paper feeding roller 25 is held by a non-illustrated frame provided in the inside of the casing 20 so that the paper feeding roller 25 is capable of making contact with the sheet 6 placed in the paper feed tray 23. The paper feeding roller 25 is rotated by a non-illustrated motor. The paper feeding roller 25 which is (being) rotated feeds the sheet 6 to a conveying path 37. The conveying path 37 is a space defined by a non-illustrated guide member. In the example depicted in the drawing, the conveying path 37 is curved and extends from a rear end of the paper feed tray 23 up to a position above the paper feed tray 23, and then extends frontward. The paper feeding roller 25, the conveying roller 26 and the discharging roller 27 are an example of a "conveyor (conveying mechanism)".

In the present specification, a direction along the conveying path 37 in which the sheet 6 is conveyed is referred to as a "conveying direction". The sheet 6 is conveyed from the paper feed tray 23 to the paper discharge tray 24 along the conveying path 37. Namely, an orientation from the paper feed tray 23 toward the paper discharge tray 24 along the conveying path 37 is referred to as an "conveying orientation". In the conveying path 37, a side closer to the paper feed tray 23 is referred to as an "upstream in the conveying direction" or an "upstream in the conveying orientation". Further, in the conveying path 37, a side closer to the paper discharge tray 24 is referred to as a "downstream in the conveying direction" or a "downstream in the conveying orientation". The conveying roller 26 is located at the downstream, in the conveying orientation of the sheet 6, of the paper feed tray 23. The conveying roller 26 constructs a roller pair together with a driven roller 35. The conveying roller 26 is rotated by a non-illustrated motor. The conveying roller 26 and the driven roller 35 which are (being) rotated convey the sheet 6 fed to the conveying path 37 by the paper feeding roller 25, while pinching or holding the sheet 6 between the conveying roller 26 and driven roller 35. The discharging roller 27 is located at the downstream, in the conveying orientation of the sheet 6, of the conveying roller 26. The discharging roller 27 constructs a roller pair together with a driven roller 36. The discharging roller 27 is driven by a non-illustrated motor. The discharging roller 27 and the driven roller 36 which are (being) rotated convey the sheet 6 and discharge the sheet 6 to the paper discharge tray 24, while pinching or holding the sheet 6 between the discharging roller 27 and driven roller 36. The platen 28 is positioned between the conveying roller 26 and the discharging roller 27 in the front-rear direction 8, at the downstream, in the conveying orientation of the sheet 6, of the conveying roller 26 and at the upstream, in the conveying orientation of the sheet 6, of the discharging roller 27.

The conveying roller 26 is provided with a rotary encoder 96. The rotary encoder 96 is an example of a "speed sensor". The rotary encoder 96 has an encoder disc 97 and an optical sensor 98. The encoder disc 97 is provided coaxially with the conveying roller 26, and rotates together with the conveying roller 26. The encoder disc 97 has a plurality of indexes. They are two kinds of indexes of which transmittance are mutually different. In the encoder disc 97, the two kinds of indexes are arranged alternately in the entire circumference in the circumferential direction of the encoder disc 97. The optical sensor 98 is capable of optically reading the two kinds of indexes of the encoder disc 97. By the reading, by the optical sensor 98, of the two kinds of indexes of the encoder disc 97 which is rotating, two kinds of signals are outputted in a pulsed shape from the optical sensor 98. The output signals from the optical sensor 98 are received by a controller which is to be described later on so as to determine a rotating speed of the conveying roller 26.

The recording unit 29 has a printing head 34 and a heater 35. The printing head 34 is positioned, in the front-rear direction 8, between the conveying roller 26 and the discharging roller 27. The printing head 34 may be a so-called serial head, or may be a so-called line head. The printing head 34 has a channel in which the ink flows and which is formed in the inside of the printing head 34. This channel is communicated with the tank 70 by a tube 31. Namely, the ink(s) stored by the tank 70 is (are) supplied to the printing head 34 via the tube 31.

The platen 28 is positioned at a location below the printing head 34. An upper surface of the platen 28 is a supporting surface of the sheet 6. Although not depicted in the respective drawings, an opening in which a suction pressure is generated is formed in the upper surface of the platen 28. By the suction pressure generated in the upper surface of the platen 28, the sheet 6 makes a tight contact with the upper surface of the platen 28.

Figure 3:
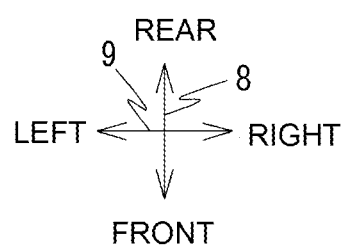
FIG. 3 is a schematic view of a heater, as seen from thereabove.
Figure 3:
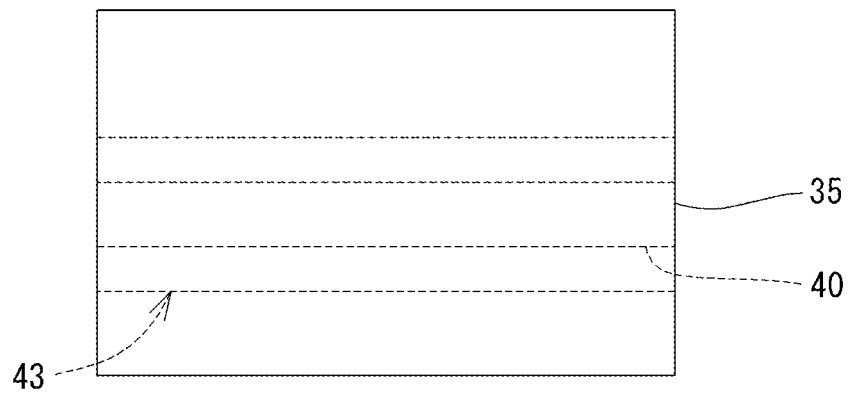
Figure 3:
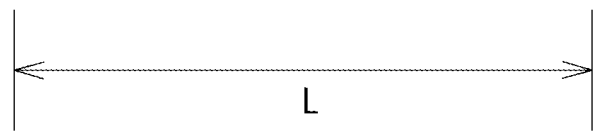

As depicted in FIGS. 2 and 3, the heater 35 is positioned at a location above the conveying path 37, at the downstream, in the conveying direction, of the printing head 34, and at the upstream, in the conveying direction, of the discharging roller 27. The heater 35 is a so-called halogen heater.

As depicted in FIG. 2, the heater 35 is positioned at the downstream in the conveying orientation of the printing head 24, namely, positioned in front of the printing head 24. The heater 35 has a halogen lamp 40 which is a heating element and which radiates an infrared light, a reflective plate 41 and a casing 42. The casing 42 has a shape of substantially rectangular parallelepiped, and is opened downward. An opening 43 is positioned in a lower wall of the casing 42. Via the opening 43, the heat from the halogen lamp 40 and/or the reflective plate 41 is/are radiated to the outside and is shielded.

The halogen lamp 40 is positioned in an internal space of the casing 42. The halogen lamp 40 has a shape of a slender cylindrical tube of which longitudinal direction is the left-right direction 9. In the internal space of the casing 42, the reflective plate 41 is positioned at a location above the halogen lamp 40. The reflective plate 41 is a metallic plate coated with a ceramic film, etc., and is curved in an arc shape with the vicinity of the opening 43 as the central axis. Note that it is allowable to use a halogen lamp 40 coated with a ceramic film, etc., instead of using the reflective plate 41.

The heater 35 heats at least one of the sheet 6 which is passing through the location below the opening 43 and the ink adhered to the sheet 6. In the present embodiment, the heater 35 heats both of the sheet 6 and the ink. By heating the ink, the resin fine particles undergo the glass transition, and by allowing the sheet 6 having passed the location below the heater 35 to be cooled, the resin which has undergone the glass transition is cured. With this, the ink is fixed to the sheet 6.

In view of the demand of miniaturization, the power consumption of the heater 35 is preferably not more than 600 W, more preferably not more than 400 W, particularly preferably not more than 200 W. The power consumption of the heater 35 relates to an energy which is radiated from the heater 35 per unit area of the sheet (irradiation energy ($\beta$)). The irradiation energy ($\beta$) is a heating amount (J) applied to the unit area ($cm^2$) of the sheet in a case that the heater 35 is driven in accordance with the power consumption and that the sheet moving at the location below the heater 35 is moved at a constant conveying speed.

As depicted in FIG. 3, in view of the demand for the miniaturization, an irradiation length L, of the heater 35, which is along the left-right direction 9 (an example of a "width direction", an example of the "second direction"), namely, the length L of a range in which the halogen lamp 40 and the opening 43 overlap with each other and along the left-right direction 9 is preferably not more than 25 cm, more preferably not more than 21 cm, particularly preferably not more than 15 cm.

Note that the heater 35 is not limited to the halogen heater, provided that the heater 35 is a heater which is capable of heating the sheet or the ink. For example, the heater 35 may be a carbon heater, a dryer, an oven, a belt conveyor oven, etc.

Figure 4:
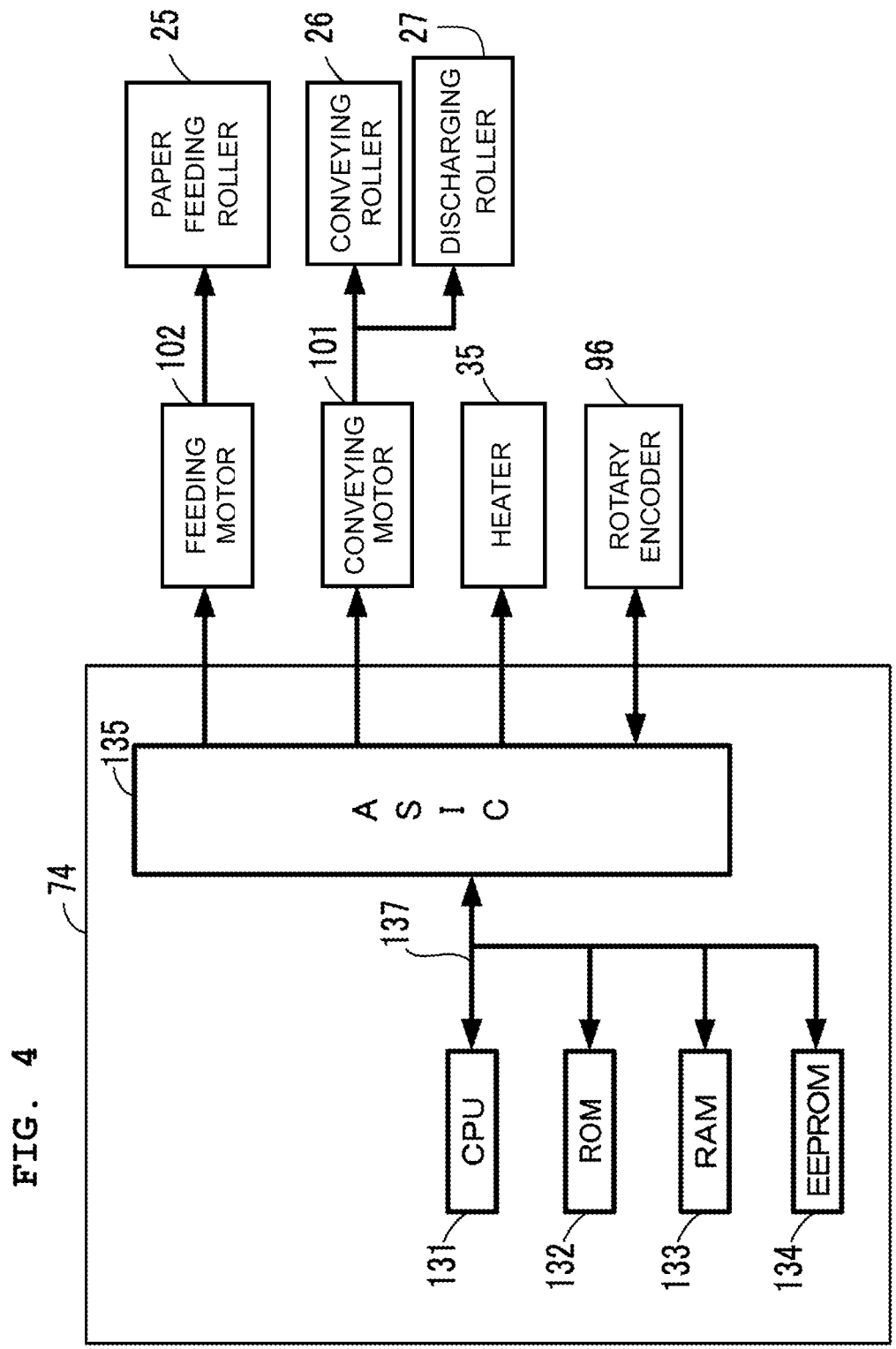
FIG. 4 is a block diagram of a controller.

As depicted in FIG. 4, a controller 74 and an electric power circuit (not depicted in the drawings) are arranged in the internal space of the casing 20. The controller 74 is constructed by connecting a CPU 31, a ROM 132, a RAM 133, an EEPROM 134, an AMC 135, etc., by a bus 137 to be capable of data communication. The CPU 131 executes a program stored in the ROM 132, and the ASIC 135 performs a specific function which is set, thereby controlling an operation of the printing apparatus 10.

Note that in the controller 74, it is allowable that only the CPU 131 performs respective kinds of processing, or that only the ASIC 135 performs the respective kinds of processings. Alternatively, it is allowable that a plurality of pieces of the CPU 131 are mounted on the controller 74 and that the plurality of pieces of the CPU 131 perform the respective processings in a sharing manner. Still alternatively, it is allowable that a plurality of pieces of the ASIC 135 are mounted on the controller 74 and that the plurality of pieces of the ASIC 135 perform the respective processings in a sharing manner.

The electric power circuit is a circuit constructed of a large capacity capacitor, etc. In the present embodiment, the electric power circuit is mounted on a substrate constructed of paper phenol, etc. The electric power circuit is a circuit performing the conversion of electric power for supplying the electricity to respective constituent components or parts provided on the printing apparatus 10.

For example, the electric power is supplied from the electric power circuit to a feeding motor 102 and a conveying motor 101, and the rotations of the respective motors 102 and 101 are transmitted to the paper feeding roller 25, the conveying roller 26 and the discharging roller 27. Further, the electric power is supplied from the electric power circuit to the heater 35.

As depicted in FIG. 2, the sheet 6 is conveyed in the front-rear direction 8 at the facing position facing the heater 35. Namely, at the facing position, the conveying direction of the sheet 6 is the front-rear direction 8 (an example of the first direction).

The irradiation energy ($\beta$) for the sheet 6 can be measured, for example, by the following manner. An electric power density ($W/m^2$) which is an electric power per unit area of the heater 35 is calculated from the electric power applied to the heater 35, and an area in which the heater 35 radiates the infrared light (an area in a plane along the front-rear direction 8 and the left-right direction 9) (for example, a projected area of the opening 43). For example, in a case that the power consumption of the heater 35 is 600 W and that the area in which the heater 35 radiates the infrared light is 50 $cm^2$, the electric power density is 12 $W/m^2$. Further, a time (second) required for a fixed point in the sheet 6 to pass the area in which the heater 35 radiates the infrared light is calculated from the conveying speed of the sheet 6. Then, by multiplying the time with the electric power density, the irradiation energy ($\beta$) ($J/cm^2$) is calculated.

[Composition of Ink]

In the following, the ink (an example of a "water-based ink for recording") stored in the tank 70 will be explained in detail. The ink includes a resin-dispersed pigment (resin-dispersible pigment, resin dispersion type pigment), resin fine particles, an organic solvent and water.

The resin-dispersed pigment is dispersible in water by, for example, a resin for dispersing pigment (resin dispersant). The resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for ample, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like. Specific examples of resin-dispersed pigments other than those described above are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 48:3, 53:1, 57, 57:1, 112, 122, 123, 139, 144, 146, 149, 150, 166, 168, 175, 176, 177, 178, 184, 185, 190, 202, 209, 221, 222, 224 and 238; C. I. Pigment Violets 19 and 196; C. I. Pigment Blues 1, 2, 3, 15, 15:1, 15:2, 15:3, 15:4, 16, 22 and 60; C. I. Pigment Greens 7 and 36; and a solid solution of any one of the above-described pigments; etc. Note that the ink may further include another pigment and another dye, etc., in addition to the resin-dispersed pigment. Further, note that it is allowable that the ink includes only the resin-dispersed pigment as the colorant, and that the ink does not contain another colorant (a pigment, a dye, etc.)

A pigment solid content amount of the resin-dispersed pigment (pigment solid component amount (P)) in the entire amount of the water-based ink is not particularly limited, and can be determined appropriately, for example, in accordance with a desired optical density or chromaticness, etc. For example, the pigment solid component amount (P) is preferably within a range of not less than 0.1% by mass to not more than 20% by mass, more preferably within a range of not less than 1% by mass to not more than 15% by mass, particularly preferably within a range of not less than 2% by mass to not more than 10% by mass. The pigment solid component amount (P) is a mass only of the pigment, and does not include the mass of the resin dispersant. Only one kind of the resin-dispersed pigment may be used singly, or two or more kinds of the resin-dispersed pigment may be used in combination.

As the resin tine particles, it is allowable to use, for example, resin fine particles including at least one of methacrylic acid and acrylic acid as a monomer; it is allowable to use, as the resin fine particles, for example, a commercially available product. It is allowable that the resin fine particles further include styrene, vinyl chloride, etc., as the monomer. The resin fine particles may be, for example, those included in a resin emulsion. The resin emulsion is composed, for example, of the resin fine particles and a dispersion medium (for example, water, etc.), wherein the resin fine particles are dispersed with respect to the dispersion medium within a range of a specific particle diameter, not being in a dissolved state. The resin fine particles included in the resin emulsion are exemplified, for example, by: fine particles of a resin based on acrylic acid, a resin based on maleate ester, a resin based on vinyl acetate, a resin based on carbonate, a resin based on polycarbonate, a resin based on styrene, a resin based on ethylene, a resin based on polyethylene, a resin based on propylene, a resin based on polypropylene, a resin based on urethane, a resin based on polyurethane, a resin based on polyester, and a resin of copolymer of the above-described resins, etc.

The glass transition temperature (Tg: $\alpha$) of the resin fine particles is not less than 33° C. The Tg of the resin fine particles is, for example, preferably in a range of not less than 33° C. to not more than 112° C., more preferably in a range of not less than 33° C. to not more than 77° C., or particularly preferably in a range of not less than 33° C. to not more than 69° C. By using resin fine particles of which Tg is within the above-described range, it is possible to obtain a water-based ink which has an excellent abrasion resistance in the recording medium.

As the resin emulsion, for example, a commercially available product of resin emulsion may be used. The commercially available product of the resin emulsion is exemplified, for example, by "KE-1062" (Tg: 112° C.) and "QE-1042" (Tg: 69° C.) manufactured by SEIKO PMC CORPORATION); "MOWINYL (MOWINYL is a registered trade mark of JAPAN COATING RESIN CO., LTD.) 6969D" (Tg: 77° C.), "MOWINYL (registered trade mark) 5450" (Tg: 53° C.), "MOWINYL (registered trade mark) DM774" (Tg: 33° C.) manufactured by JAPAN COATING RESIN CO., LTD.; "SUPERFLEX (SUPERFLEX is a registered trade mark of DAI-ICHI KOGYO SEIYAKU CO., LTD.) 150" (Tg: 40° C.), manufactured by DKS CO., LTD (DAI-ICHI KOGYO SEIYAKU CO., LTD.); and the like.

The average particle diameter (average particle size) of the resin fine particles is, for example, within a range of not less than 30 nm to not more than 200 nm. The average particle diameter can be calculated, for example, by using a dynamic light scattering particle diameter distribution measuring apparatus "LB-550" manufactured by HORIBA, LTD., as an arithmetic average diameter.

The content amount (R) of the resin fine particles in the entire amount of the water-based ink is, for example, preferably within a range of not less than 0.1% by mass to not more than 30% by mass, more preferably within range of not less than 0.5% by mass to not more than 20% by mass, particularly preferably within a range of not less than 1% by mass to not more than 10% by mass. One kind of the resin fine particles may be used singly, or two or more kinds of the resin fine particles may be used in combination.

The organic solvent prevents, for example, the ink from drying at an end part of a nozzle in an ink-jet head. Namely, the organic solvent may function as a humectant. The organic solvent includes an organic solvent of which saturation vapor pressure at 20° C. is not less than 0.03 hPa (hereinafter referred to as a "specific organic solvent"). It is preferred that the saturation vapor pressure at 20° C. of the specific organic solvent is in a range of 0.03 hPa to 0.11 hPa. The specific organic solvent is exemplified, for example, by propylene glycol (saturation vapor pressure at 20° C.: 0.11 hPa), diethylene glycol (saturation vapor pressure at 20° C.: 0.03 hPa), etc., and propylene glycol is preferred. In a case that the specific organic solvent is propylene glycol, it is possible to obtain an ink which has a further excellent abrasion resistance with respect to the recording medium.

The content amount (II) of the specific organic solvent in the entire amount of the water-based ink is, for example, preferably in a range of not less than 1% by mass to not more than 50% by mass, more preferably in a range of not less than 5% by mass to not more than 40% by mass, particularly preferably in a range of not less than 10% by mass to not more than 30% by mass.

It is allowable that the organic solvent includes an organic solvent which is different from the specific organic solvent, and that the organic solvent does not include an organic solvent which is different from the specific organic solvent. The humectant which is different from the specific organic solvent is not particularly limited, and is exemplified, for example, by: glycerol, triethylene glycol, butylene glycol, dipropylene glycol, tripropylene glycol, thiodiglycol, trimethylol propane, trimethylol ethane, polyethylene glycol, polypropylene glycol, etc. One kind of these organic solvents may be used singly, or two or more kinds of the organic solvents may be used in combination.

The mass ratio of the specific organic solvent in the entire amount of the organic solvent is, for example, preferably not less than 50% by mass, more preferably not less than 70% by mass, particularly preferably 100% by mass.

The ink may further include a water-soluble organic solvent which is different from the organic solvent. The water-soluble organic solvent which is different from e humectant is exemplified, for example, by a penetrant which adjusts the drying velocity on the recording medium.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the ink is, for example, preferably in a range of not less than 0% by mass to not more than 20% by mass, more preferably in a range of not less than 0% by mass to not more than 15% by mass, or particularly preferably in a range of not less than 1% by mass to not more than 3% by mass.

The water is preferably ion-exchange water or purified water (pure water). A content amount (W) of the water with respect to the entire amount of the ink is, for example, preferably within a range of not less than 10% by mass to not more than 90% by mass, more preferably within a range of not less than 20% by mass to not more than 80% by mass. The content amount (W) of the water may be, for example, a balance of the other components.

The ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The ink can be prepared, for example, by uniformly mixing the resin-dispersed pigment, the resin fine particles, the specific organic solvent and the water, and an optionally other additive(s) as necessary, by a conventionally known method, and then removing any non-dissolved matter, with a filter, etc.

The relationship between the glass transition temperature "α" (° C.) of the resin fine particles included in the ink and an irradiation energy β (J/cm$^2$), per unit area, of the heater 35 satisfies the following condition (I), condition (II) or condition (III). The irradiation energy β is an energy which is radiated from the heater 35 per unit area of the sheet.

$6 \leq (\beta/\alpha) \times 1000 \leq 31$      Condition (I)

$6 \leq (\beta/\alpha) \times 1000 \leq 27$      Condition (II)

$9 \leq (\beta/\alpha) \times 1000 \leq 15$      Condition (III)

The glass transition temperature α of the resin fine particles can be measured, for example, as follows. A differential scanning calorimeter "EXSTAR (trade name) 6000" (manufactured by SEIKO INSTRUMENTS INC.) is used; a container which is made of aluminum and in which 5 mg of a sample is stored is set in the apparatus (the differential scanning calorimeter); and the temperature is increased from 20° C. up to 200° C. under an atmosphere of nitrogen and under a condition of a temperature increasing rate of 10° C./minute. Then, after maintaining the sample for 1 (one) minute at 200° C., the sample is cooled up to −20° C. at a cooling rate of −10° C./minute. Then, after further maintaining the sample for 1 (one) minute at −20° C., the temperature of is raised up to 200° C. at the temperature increasing rate of 10° C./minute. By doing so, a DSC (Differential Scanning Calorimetry) curve is obtained. Based on the obtained DSC curve, the point of inflection in the second temperature increasing process is defined as the glass transition temperature.

The irradiation energy β, per unit area, of the heater 35 can be measured, for example, by the following manner. An electric power density (W/m$^2$) which is an electric power per unit area of the heater 35 is calculated from the electric power applied to the heater 35, an area in which the heater 35 radiates the infrared light (an area in a plane along the front-rear direction 8 and the left-right direction 9) (for example, a projected area of the opening 43). For example, in a case that the power consumption of the heater 35 is 600 W and that the area in which the heater 35 radiates the infrared light is 50 cm$^2$, the electric power density is 12 W/m$^2$. Further, a time (seconds) required for a fixed point in the sheet 6 to pass the area in which the heater 35 radiates the infrared light is calculated form the conveying speed of the sheet 6. Then, by multiplying the time with the electric power density, the irradiation energy β (J/cm$^2$) is calculated.

[Operation of Printing Apparatus 10]

In the following, an operation of image recording by the printing apparatus 10 will be explained, with reference to FIG. 4.

In a case that the controller 74 receives print data, the controller 74 causes the paper feeding roller 25, the conveying roller 26 and the discharging roller 27 to rotate (rotate normally) so as to feed the sheet 6 to the location below the printing head 24.

The controller 74 controls the conveying roller 26 and the discharging roller 27 so as to convey the sheet 6 along the conveying direction from the upstream toward the downstream in the conveying direction. At the position facing the heater 35, the sheet 6 is conveyed frontward in the front-rear direction 8. Namely, at the position facing the heater 35, the conveying direction is the front-rear direction 8 (an example of the first direction). At the position facing the heater 35, the conveying speed of the sheet 6 is preferably within a range of not less than 20 cm/second to not more than 100 cm/second, more preferably within a range of not less than 20 cm/second to not more than 80 cm/second, particularly more preferably within a range of not less than 20 cm/second to not more than 70 cm/second. The controller 74 controls the conveying speed of the sheet 6 so that the conveying speed of the sheet 6 is within the above-described range. Specifically, the controller 74 controls the conveying roller 26 and the discharging roller 27 so as to rotate the conveying roller 26 and the discharging roller 27 so that the conveying speed of the sheet 6 is within the above-described range. Such a control of the conveying speed is realized, for example, by performing control of the rotation of the conveying roller 26 based on the signals of the rotary encoder 96 provided on the conveying roller 26.

Further, the controller 74 turns on the power of the halogen lamp 40 of the heater 35. The irradiation energy β, per unit area, of the heater 35 is, for example, preferably within a range of not less than 0.4 J/cm$^2$ to not more than 2.1 J/cm$^2$, more preferably within a range of not less than 0.5 J/cm$^2$ to not more than 2.1 J/cm$^2$, particularly preferably within a range of not less than 0.6 J/cm$^2$ to not more than 2.1 J/cm$^2$. Such a control of the irradiation energy, per the unit area, of the heater 35 is realized by controlling an electric power (W) supplied to the heater 35. Further, the controller 74 causes the ink(s) to be discharged, based on the print data, from the printing head 34 toward the sheet 6, while causing the paper feeding roller 25, the conveying roller 26 and the discharging roller 27 to rotate (rotate normally).

The sheet 6 which is conveyed on the platen 28 toward the paper discharge tray 24 is moved toward the paper discharge tray 24, between the conveying roller 26 and the discharging roller 27, while being sucked by the upper surface of the platen 28. Ink droplets of the ink(s) discharged from the printing head 34 adhere to the sheet 6 which is supported by the upper surface of the platen 28. In a case that the sheet 6 to which the ink droplets are adhered reaches the location below the heater 35, the sheet 6 is heated by the heater 35. The ink droplets are fixed to the sheet 6 by the heating performed by the heater 35.

In a case that the controller 74 determines that the printing based on the print data is ended, then in accordance with this determination, the controller 74 conveys the sheet 6 until the sheet 6 is discharged to the paper discharge tray 24, then the controller 74 stops the paper feeding roller 25, the conveying roller 26 and the discharging roller 27. Further, the controller 74 turns off the power of the halogen lamp 40 of the heater 35.

By making the glass transition temperature α (° C.) of the resin fine particles included in the ink to be not less than 33° C., and by making relationship between the glass transition temperature α (° C.) of the resin fine particles included in the ink and the irradiation energy β (J/cm$^2$), per unit area, of the heater 35 to satisfy the above-described condition (I), condition (II) or condition (III), then even in a case that the irradiation energy β (J/cm$^2$), per unit area, applied from a small-sized heater 35 is not great, the resin fine particles are melted so as to form a film which has an appropriate thickness and which covers the pigment included in the ink. It is presumed that the abrasion resistance (friction resistance) of the ink is improved by making the strength of this film to be high. Further, since the thickness of this film becomes uniform, it is presumed that the glossiness of the ink in the sheet after printer is improved. Further, by using the small-sized heater 35, any increase in the size of the printing apparatus 10 is suppressed.

Furthermore, since the organic solvent included in the ink has the saturation vapor pressure at 20° C. which is not less than 0.03 hPa, it is considered that the organic solvent is easily evaporated in a case that the ink is heated by the heater 35 in a state that the ink adheres on the sheet 6 and thus improves the abrasion resistance of the ink. Moreover, since the glass transition temperature α (° C.) of the resin fine particles is not less than 33° C., it is presumed that, even in a case that the ink is dried, even without being heated by the heater 35, in the vicinity of the nozzle 30 of the printing head 24, the bonding between the resin fine particles is weak, which in turn easily dissolve the dried state of the ink. It is presumed that this improves the discharging stability of the ink by the head 24. As described above, in the printing apparatus 10 of the present embodiment, the abrasion resistance and the glossiness of the recording medium after printing are excellent, and the discharging stability of the ink in the head is excellent, while suppressing the size of the apparatus from becoming large.

EXAMPLES

In the following, Examples of the present disclosure are explained together with Comparative Examples. Note that the present disclosure is not limited to or restricted by Examples and Comparative Examples described below.

[Aqueous Pigment Dispersion A]

Pure water (purified water) was added to 20% by mass of a pigment (carbon black) and 7% by mass of a sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter (pore size 3.0 μm). Thus, aqueous pigment dispersion (water pigment dispersion) A was obtained. Note that the styrene-acrylic acid copolymer is a water-soluble polymer which is generally used as a dispersant for pigment (pigment dispersant).

[Preparation of Water-Based Ink for Recording]

Components, which were included in Water-based Ink Composition as indicated in TABLE 1 and TABLE 2 and which were different from the fine resin particles and the aqueous pigment dispersion (resin-dispersed aqueous pigment dispersion) A, were mixed uniformly or homogeneously; and thus an ink solvent was obtained. Subsequently, the resin fine particles were added to the ink solvent followed by being mixed uniformly, and then the aqueous pigment dispersion A was added to the obtained mixture so as to obtain a mixture of which entire amount was 100% by mass. After that, the obtained mixture was filtrated through a cellulose acetate membrane filter (pore size 3.00 produced by TOYO ROSHI KAISHA, LTD., and thus a water-based ink for recording of each of Examples 1 to 18 and Comparative Examples 1 to 13 indicated in TABLE 1 and TABLE 2 was obtained.

Resin fine particles: "KE-1062" (Tg: 112° C.) and "QE-1042" (Tg: 69° C.) manufactured by SEIKO PMC CORPORATION); "MOWINYL (registered trade mark) 6969D" (Tg: 77° C.), "MOWINYL (registered trade mark) DM774" (Tg: 33° C.) manufactured by JAPAN COATING RESIN CO., LTD.; or "POLYSOL (POLYSOL is a registered trade mark of SHOWA DENKO K.K.) AP-3270N" (Tg: 27° C.) manufactured by SHOWA DENKO K.K.

Humectant: propylene glycol (saturation vapor pressure at 20° C.: 0.11 hPa), glycerol (saturation vapor pressure at 20° C.: less than 0.01 hPa), tripropylene glycol (saturation vapor pressure at 20° C.: less than 0.01 hPa), diethylene glycol (saturation vapor pressure at 20° C.: 0.03 hPa)

Penetrant: triethylene glycol monobutyl ether (BTG), tripropylene glycol monobutyl ether (TPnB)

Surfactant: "OLFINE (OLFINE is a registered trade mark of NISSAN KOGAKU KK) E1010" manufactured by NISSHIN KAGAKU KOGYO KK The water-based inks of Examples 1 to 18 and Comparative Examples 1 to 13 were used so as to perform recording on the coated paper, and the evaluations of the abrasion resistance, the glossiness, and the discharging stability were performed by the following methods.

[Abrasion Resistance]

An ink-jet printer MFC-J4225N produced by BROTHER INDUSTRIES., LTD., was used so as to form an image of a single color patch with a resolution of 600 dpi×300 dpi on coated paper ("OK TOP COAT+(a registered trade mark of OJI PAPER CO., LTD.)" produced by OJI PAPER CO., LTD.), by using each of the water-based inks of Examples 1 to 18 and Comparative Examples 1 to 13, thereby producing an evaluation sample. Then, the produced evaluation sample was set in a conveying apparatus (conveyer) and made the evaluation sample set in the conveyer to pass a location immediately below a IR heater "PROMO HANDY MINI (a registered trade mark of TOHKOH TRADE CO., LTD.) SIR-760" manufactured by TOHKOH TRADE CO., LTD., (heating length: 6.2 cm, power output: 600 W) while changing a conveying speed, thereby drying (heating) the evaluation sample. Afterwards, the evaluation sample was dried under a condition of 25° C. and 1 (one) hour. Then, the evaluation sample was subjected to a reciprocating rubbing (scratching) repeatedly for 100 times with AB-301 Color Fastness Rubbing Tester manufactured by TESTER SANGYO CO., LTD., under a load of 500 g, thereby performing a rubbing test for the evaluation sample. Regarding the evaluation sample for which the rubbing was performed, a visual inspection was performed for a blank part (blank sheet part) adjacent to a black solid color part, and the evaluation was performed therefor in accordance with the following criterion for evaluation.

<Criterion for Evaluation of Abrasion Resistance>
A: No dirtied part (smudge) was present.
B: A dirtied part was slightly present.
C: A dirtied part was present.

[Glossiness]

The glossiness (60°) of a black solid color part, of an evaluation sample obtained in a similar manner as regarding the abrasion resistance, was measured by using a gloss meter HG-268 manufactured by SUGA TEST INSTRUMENTS CO., LTD., and the evaluation was performed therefor, based on the measured value, in accordance with the following criterion for evaluation.

<Criterion for Evaluation of Glossiness>
A: not less than 42
B: not less than 38 and less than 42
C: less than 38

[Discharging Stability]

The ink-jet printer MFC-J4225N produced by BROTHER INDUSTRIES., LTD., was used so as to print ruled lines continuously on 100 sheets of exclusive paper "BP60PA" manufactured by BROTHER INDUSTRIES, LTD., with a resolution of 600 dpi×300 dpi by using each of the water-based inks of Examples 1 to 18 and Comparative Examples 1 to 13, and the evaluation was performed for the evaluation sample in accordance with the following criterion for evaluation.

<Criterion for Evaluation of Discharging Stability>
A: There was no disturbance in the ruled lines even after printing continuously on 100 sheets of the exclusive paper.
B: Although there was no disturbance in the ruled lines even after printing continuously on 10 sheets of the exclusive paper, there was a disturbance in the ruled lines after printing continuously on 100 sheets of the exclusive paper.
C: There was a disturbance in the ruled lines after printing continuously on less than 10 sheets of the exclusive paper.

[Overall Grade]

The overall grade of the evaluation sample was evaluated, based on the evaluations of the three items which were the abrasion resistance, the glossiness and the discharging stability, in accordance with the following criterion for evaluation.

<Criterion for Evaluation of Overall Grade>
A: "A" in all the three items.
B: Two "A"s in two items and one "B" in the remaining one item among the three items.
C: One "A" in one item and two "B"s in the remaining two items among the three items.
D: There was a "C" even in one item among the three items.

The water-based ink composition and the results of evaluations of each of the water-based inks of Examples 1 to 18 and Comparative Examples 1 to 13 are indicated in TABLE 1 and TABLE 2.

TABLEs 1 and 2 (Following)—LEGEND

*1: The numeral of the resin-dispersed pigment indicates a pigment solid component amount.
*2: The numeral of the resin fine particles indicates a solid component amount of the resin fine particles.

TABLE 1

| | | | | EXAMPLES | | | | | |
| --- | --- | --- | --- | --- | --- | --- | --- | --- | --- |
| | | | | 1 | 2 | 3 | 4 | 5 | 6 |
| Composition of Water-based Ink for recording (% by mass) | Resin-dispersed pigment *1 | | Tg (° C.): α | 5 | 5 | 5 | 5 | 5 | 5 |
| | Resin fine particles *2 | KE1062 | 112 | 5 | — | — | — | — | — |
| | | MOWINYL 6969D | 77 | — | 5 | 5 | 5 | — | — |
| | | QE-1042 | 69 | — | — | — | — | 5 | 5 |
| | | MOWINYL DM774 | 33 | — | — | — | — | — | — |

TABLE 1-continued

| | | | Examples (cont.) | | | | | |
|---|---|---|---|---|---|---|---|---|
| | Humectant | Propylene glycol | 20 | 20 | 20 | 20 | 20 | 20 |
| | | Glycerol | — | — | — | — | — | — |
| | | Tripropylene glycol | — | — | — | — | — | — |
| | | Diethylene glycol | — | — | — | — | — | — |
| | Penetrant | Triethylene glycol monobutyl ether | 3 | 3 | 3 | 3 | 3 | 3 |
| | | Tripropylene glycol monobutyl ether | — | — | — | — | — | — |
| | Surfactant | OLFIN E1010 *7 | 1 | 1 | 1 | 1 | 1 | 1 |
| | Water | | balance | balance | balance | balance | balance | balance |
| Conveying speed (cm/s) | | | 20 | 20 | 40 | 70 | 20 | 40 |
| Irradiation energy (J/cm$^2$): β | | | 2.1 | 2.1 | 1.0 | 0.6 | 2.1 | 1.0 |
| 1000 × β/α | | | 19 | 27 | 13 | 8 | 30 | 15 |
| Results of evaluations | Abrasion resistance | | B | A | A | B | B | A |
| | Glossiness | | A | B | A | A | B | A |
| | Discharging stability | | A | A | A | A | A | A |
| Overall grade | | | B | B | A | B | C | A |

| | | | | EXAMPLES | | | | | |
|---|---|---|---|---|---|---|---|---|---|
| | | | | 7 | 8 | 9 | 10 | 11 | 12 |
| Composition of Water-based Ink for recording (% by mass) | Resin-dispersed pigment *1 | | | 5 | 5 | 5 | 5 | 5 | 5 |
| | | | Tg (° C.): α | | | | | | |
| | Resin fine particles *2 | KE1062 | 112 | — | — | — | — | — | — |
| | | MOWINYL 6969D | 77 | — | — | — | — | — | 5 |
| | | QE-1042 | 69 | 5 | 5 | — | — | — | — |
| | | MOWINYL DM774 | 33 | — | — | 5 | 5 | 5 | — |
| | Humectant | Propylene glycol | | 20 | 20 | 20 | 20 | 20 | 10 |
| | | Glycerol | | — | — | — | — | — | — |
| | | Tripropylene glycol | | — | — | — | — | — | — |
| | | Diethylene glycol | | — | — | — | — | — | — |
| | Penetrant | Triethylene glycol monobutyl ether | | 3 | 3 | 3 | 3 | 3 | 3 |
| | | Tripropylene glycol monobutyl ether | | — | — | — | — | — | — |
| | Surfactant | OLFIN E1010 | | 1 | 1 | 1 | 1 | 1 | 1 |
| | Water | | | balance | balance | balance | balance | balance | balance |
| Conveying speed (cm/s) | | | | 70 | 100 | 40 | 70 | 100 | 40 |
| Irradiation energy (J/cm$^2$): β | | | | 0.6 | 0.4 | 1.0 | 0.6 | 0.4 | 1.0 |
| 1000 × β/α | | | | 9 | 6 | 31 | 18 | 13 | 13 |
| Results of evaluations | Abrasion resistance | | | A | B | B | A | A | A |
| | Glossiness | | | A | A | B | B | A | A |
| | Discharging stability | | | A | A | A | A | A | A |
| Overall grade | | | | A | B | C | B | A | A |

| | | | | EXAMPLES | | | | | |
|---|---|---|---|---|---|---|---|---|---|
| | | | | 13 | 14 | 15 | 16 | 17 | 18 |
| Composition of Water-based Ink for recording (% by mass) | Resin-dispersed pigment *1 | | | 5 | 5 | 5 | 5 | 5 | 5 |
| | | | Tg (° C.): α | | | | | | |
| | Resin fine particles *2 | KE1062 | 112 | — | — | — | — | — | — |
| | | MOWINYL 6969D | 77 | 5 | 5 | 5 | 5 | 5 | 5 |
| | | QE-1042 | 69 | — | — | — | — | — | — |
| | | MOWINYL DM774 | 33 | — | — | — | — | — | — |
| | Humectant | Propylene glycol | | 30 | 20 | 20 | 20 | 18 | 21 |
| | | Glycerol | | — | 6 | — | — | — | — |
| | | Tripropylene glycol | | — | — | 6 | — | — | 9 |
| | | Diethylene glycol | | — | — | — | — | 10 | — |
| | Penetrant | Triethylene glycol monobutyl ether | | 3 | 3 | 3 | — | 3 | 3 |
| | | Tripropylene glycol monobutyl ether | | — | — | — | 1 | — | — |
| | Surfactant | OLFIN E1010 | | 1 | 1 | 1 | 1 | 1 | 1 |
| | Water | | | balance | balance | balance | balance | balance | balance |
| Conveying speed (cm/s) | | | | 40 | 40 | 40 | 40 | 70 | 70 |
| Irradiation energy (J/cm$^2$): β | | | | 1.0 | 1.0 | 1.0 | 1.0 | 0.6 | 0.6 |
| 1000 × β/α | | | | 13 | 13 | 13 | 13 | 8 | 8 |
| Results of evaluations | Abrasion resistance | | | A | A | A | A | B | B |
| | Glossiness | | | A | A | A | A | A | A |
| | Discharging stability | | | A | A | A | A | A | A |
| Overall grade | | | | A | A | A | A | B | B |

TABLE 2

| | | | | COMPARATIVE EXAMPLES | | | | | | |
|---|---|---|---|---|---|---|---|---|---|---|
| | | | | 1 | 2 | 3 | 4 | 5 | 6 | 7 |
| Composition of Water-based Ink for | Resin-dispersed pigment *1 | | | 5 | 5 | 5 | 5 | 5 | 5 | 5 |
| | | | Tg (° C.): α | | | | | | | |
| | Resin fine | KE1062 | 112 | 5 | 5 | 5 | — | — | — | — |

TABLE 2-continued

| | | | | | | | | | | |
|---|---|---|---|---|---|---|---|---|---|---|
| recording (% by mass) | particles *2 | MOWINYL 6969D | 77 | — | — | — | 5 | 5 | — | — |
| | | QE-1042 | 69 | — | — | — | — | — | 5 | — |
| | | MOWINYL DM774 | 33 | — | — | — | — | — | — | 5 |
| | | POLYSOL AP-3720N | 27 | — | — | — | — | — | — | — |
| | Humectant | Propylene glycol | | 20 | 20 | 20 | 20 | 20 | 20 | 20 |
| | | Glycerol | | — | — | — | — | — | — | — |
| | | Tripropylene glycol | | — | — | — | — | — | — | — |
| | Penetrant | Triethylene glycol monobutyl ether | | 3 | 3 | 3 | 3 | 3 | 3 | 3 |
| | Surfactant | OLFIN E1010 *7 | | 1 | 1 | 1 | 1 | 1 | 1 | 1 |
| | Water | | | balance | balance | balance | balance | balance | balance | balance |
| Conveying speed (cm/s) | | | | 10 | 70 | 100 | 10 | 100 | 10 | 10 |
| Irradiation energy (J/cm²): β | | | | 4.1 | 0.6 | 0.4 | 4.1 | 0.4 | 4.1 | 4.1 |
| 1000 × β/α | | | | 37 | 5 | 4 | 54 | 5 | 60 | 126 |
| Results of evaluations | Abrasion resistance | | | B | C | C | B | C | B | B |
| | Glossiness | | | C | B | B | C | A | C | C |
| | Discharging stability | | | A | A | A | A | A | A | A |
| Overall grade | | | | D | D | D | D | D | D | D |

| | | | | COMPARATIVE EXAMPLES | | | | | |
|---|---|---|---|---|---|---|---|---|---|
| | | | | 8 | 9 | 10 | 11 | 12 | 13 |
| Composition of Water-based Ink for recording (% by mass) | Resin-dispersed pigment *1 | | | 5 | 5 | 5 | 5 | 5 | 5 |
| | Resin fine particles *2 | Tg (° C.): α | | | | | | | |
| | | KE1062 | 112 | — | — | — | — | — | — |
| | | MOWINYL 6969D | 77 | — | — | — | — | 5 | 5 |
| | | QE-1042 | 69 | — | — | — | — | — | — |
| | | MOWINYL DM774 | 33 | — | — | — | — | — | — |
| | | POLYSOL AP-3720N | 27 | 5 | 5 | 5 | 5 | — | — |
| | Humectant | Propylene glycol | | 20 | 20 | 20 | 20 | — | — |
| | | Glycerol | | — | — | — | — | 20 | — |
| | | Tripropylene glycol | | — | — | — | — | — | 20 |
| | Penetrant | Triethylene glycol monobutyl ether | | 3 | 3 | 3 | 3 | — | — |
| | Surfactant | OLFIN E1010 *7 | | 1 | 1 | 1 | 1 | 1 | 1 |
| | Water | | | balance | balance | balance | balance | balance | balance |
| Conveying speed (cm/s) | | | | 10 | 40 | 70 | 100 | 40 | 40 |
| Irradiation energy (J/cm²): β | | | | 4.1 | 1.0 | 0.6 | 0.4 | 1.0 | 1.0 |
| 1000 × β/α | | | | 154 | 38 | 22 | 15 | 13 | 13 |
| Results of evaluations | Abrasion resistance | | | B | B | B | A | C | C |
| | Glossiness | | | C | C | B | B | A | A |
| | Discharging stability | | | C | C | C | C | A | A |
| Overall grade | | | | D | D | D | D | D | D |

As indicated in TABLE 1, in Examples 1 to 18, the evaluations of the abrasion resistance, the glossiness, the discharging stability did not have any evaluations of "C", and the results of the evaluations were satisfactory. Further, each of Examples 1 to 4, 6 to 8 and 10 to 18 which satisfied the above-described condition (II) had the overall grade "A" or "B" which was superior to those of Examples 5 and 9 each of which did not satisfy the condition (II) (overall grade: C). Furthermore, Example 1 and Example 2 of which conditions were similar except for the kind of the resin fine particles, and which both satisfied the condition (II) are compared. In Example 2 in which the glass transition temperature Tg (α) was in the range of not less than 33° C. and not more than 77° C. had a result of "A" in the evaluation of the abrasion resistance, and had a more satisfactory result of the evaluation of the abrasion resistance, as compared with Example 2 in which the glass transition temperature Tg (α) exceeded 77° C. (the result of evaluation of the abrasion resistance: B). Moreover, Examples 3, 6, 7 and 11 to 16 each of which satisfied the above-described condition (III) had the overall grade "A" which was superior to those of Examples 1, 2, 4, 5, 8-10, 17 and 18 which did not satisfy the condition (III) (each having the overall grade: "B" or "C").

On the other hand, in Comparative Examples 1 to 9 each of which did not satisfy the above-described condition (I) had the overall grade of "D". Further, in Comparative Examples 8 to 11 in each of which the Tg (α) of the resin fine particles was less than 33° C. had the overall grade of "D", and the evaluation of the discharging stability was also "C". Furthermore, in Comparative Examples 12 and 13 each containing the humectant of which saturation vapor pressure at 20° C. was less than 0.03 hPa, the evaluation of the abrasion resistance was unsatisfactory.

What is claimed is:

1. An ink discharging apparatus comprising:
 a conveyor configured to convey a recording medium in a conveying direction;
 a head configured to discharge the water-based ink for recording onto the recording medium conveyed by the conveyor; and
 a heater which is located at downstream in the conveying direction of the head, and is configured to heat the recording medium or the water-based ink for recording adhered to the recording medium,
 wherein the water-based ink for recording includes:
  a resin-dispersed pigment,
  resin fine particles of which glass transition temperature is not less than 33° C.
  water, and
  an organic solvent including a specific organic solvent of which saturation vapor pressure at 20° C. is not less than 0.03 hPa, and
 the ink discharging apparatus satisfies the following condition (I):

$$6 \leq (\beta/\alpha) \times 1000 \leq 31,  \quad \text{Condition (I)}$$

in the condition (I),

α (° C.) being the glass transition temperature of the resin fine particles, and β (J/cm²) being an irradiation energy, radiated from the heater, per unit area of the recording medium, and being expressed by multiplying an electric power density (W/m²) of the heater with an irradiation time of the heater.

2. The ink discharging apparatus according to claim 1, wherein the glass transition temperature of the resin fine particles is in a range of 33° C. to 77° C.

3. The ink discharging apparatus according to claim 1, satisfying the following condition (II):

$$6 \leq (\beta/\alpha) \times 1000 \leq 27, \quad \text{Condition (II)}$$

in the condition (II),

α (° C.) being the glass transition temperature of the resin fine particles, and β (J/cm²) being an irradiation energy, radiated from the heater, per unit area of the recording medium.

4. The ink discharging apparatus according to claim 1, satisfying the following condition (III):

$$9 \leq (\beta/\alpha) \times 1000 \leq 15, \quad \text{Condition (III)}$$

in the condition (III),

α (° C.) being the glass transition temperature of the resin fine particles, and (J/cm²) being an irradiation energy, radiated from the heater, per unit area of the recording medium.

5. The ink discharging apparatus according to claim 1, wherein the water-based ink for recording further contains glycol ether and a surfactant.

6. The ink discharging apparatus according to claim 1, wherein the resin fine particles are formed of a resin based on acrylic acid.

7. The ink discharging apparatus according to claim 1, wherein the irradiation energy β is in a range of 0.4 J/cm² to 2.1 J/cm².

8. The ink discharging apparatus according to claim 1, further comprising a controller configured to control the conveyor, the head and the heater, wherein the controller is configured to control the conveyor so as to convey the recording medium so that a conveying speed of the recording medium at a facing position at which the recording medium faces the heater is in a range of 20 cm/second to 100 cm/second.

9. The ink discharging apparatus according to claim 1, wherein an electrical power consumption of the heater is not more than 600W.

10. The ink discharging apparatus according to claim 1, further comprising a controller configured to control the conveyor, the head and the heater.

11. The ink discharging apparatus according to claim 1, further comprising a casing which accommodates the conveyor, the head, the heater and the controller.

12. The ink discharging apparatus according to claim 1, wherein a content amount of the specific organic solvent to an entire amount of the organic solvent is not less than 70% by mass.

13. The ink discharging apparatus according to claim 12, wherein the content amount of the specific organic solvent to the entire amount of the water-based ink for recording is not less than 10% by mass.

14. The ink discharging apparatus according to claim 1, wherein the saturation vapor pressure at 20° C. of the specific organic solvent is in a range of 0.03 hPa to 0.11 hPa.

15. The ink discharging apparatus according to claim 1, wherein the specific organic solvent is propylene glycol, diethylene glycol, or a mixture of the propylene glycol and the diethylene glycol.

16. The ink discharging apparatus according to claim 1, wherein the resin fine particles are included in a resin emulsion.

17. An ink heating method of using the ink discharging apparatus as defined claim 1, the ink heating method comprising heating, by the heater; the recording medium or the water-based ink for recording adhered to the recording medium, wherein the ink heating method satisfies the following condition (I):

$$6 \leq (\beta/\alpha) \times 1000 \leq 31, \quad \text{Condition (I)}$$

in the condition (I),

α (° C.) being a glass transition temperature of the resin fine particles, and

β(J/cm²) being an irradiation energy, radiated from the heater, per unit area of the recording medium.

18. A water-based ink for recording comprising:

a resin-dispersed pigment;

resin fine particles of which glass transition temperature is not less than 33° C.;

an organic solvent including a specific organic solvent of which saturation vapor pressure at 20° C. is not less than 0.03 hPa; and water, wherein the water-based ink for recording discharged from a printing head is fixed to a recording medium in a state that the recording medium is heated by a heater so that the water-based ink for recording satisfies the following condition (I):

$$6 \leq (\beta/\alpha) \times 1000 \leq 31, \quad \text{Condition (I)}$$

in the condition (I),

α (° C.) being the glass transition temperature of the resin fine particles, and β (J/cm²) being an irradiation energy, radiated from the heater, per unit area of the recording medium.

19. An ink discharging apparatus comprising:

a conveyor configured to convey a recording medium in a conveying direction;

a head configured to discharge the water-based ink for recording onto the recording medium conveyed by the conveyor; and a heater which is located at downstream in the conveying direction of the head, and which is configured to heat the recording medium or the water-based ink for recording adhered to the recording medium, wherein the water-based ink for recording includes:
- a resin-dispersed pigment,
- resin fine particles of which glass transition temperature s not less than 33° C.,
- water, and
- an organic solvent including a specific organic solvent of which saturation vapor pressure at 20° C. is not less than 0.03 hPa, and the ink discharging apparatus satisfies the following condition (I):

$$6 \leq (\beta/\alpha) \times 1000 \leq 31, \quad \text{condition (I)}$$

in the condition (I), $\alpha$ (° C.) being the glass transition temperature of the resin fine particles, and $\beta$ (J/cm$^2$) being an irradiation energy, radiated from the heater, per unit area of the recording medium;

wherein at a facing position at which the recording medium faces the heater, the conveying direction of the recording medium is a first direction; and an irradiation length, of the heater, along a second direction which is orthogonal to the first direction is not more than 21 cm.

* * * * *